United States Patent [19]

Davis

[11] 4,337,378

[45] Jun. 29, 1982

[54] ON-HOOK/OFF-HOOK DETECTOR CIRCUIT

[75] Inventor: Harold L. Davis, The Colony, Tex.

[73] Assignee: Mostek Corporation, Carrollton, Tex.

[21] Appl. No.: 273,842

[22] PCT Filed: Dec. 22, 1980

[86] PCT No.: PCT/US80/01699

§ 371 Date: Dec. 22, 1980

§ 102(e) Date: Dec. 22, 1980

[51] Int. Cl.$^3$ .............................................. H04M 3/22
[52] U.S. Cl. ................................................ 179/18 FA
[58] Field of Search ............ 179/18 F, 18 FA, 84 R, 179/84 A, 84 T, 16 AA; 307/354; 328/115, 116

[56] References Cited

U.S. PATENT DOCUMENTS 3,205,312 9/1965 Brightman et al. ................ 179/18 F
4,220,825 9/1980 Fahey ............................ 179/18 FA Primary Examiner—Thomas A. Robinson

[57] ABSTRACT

An on-hook/off-hook detector circuit (10) is included within a telecommunications integrated circuit. A tone generator power signal ($V_G$) is monitored as a status signal to determine when a telephone switch hook is in either an on-hook or off-hook condition. The tone generator power signal is subject to interference and transients which prevents direct utilization of it to indicate on-hook and off-hook conditions. A resistor (20) and capacitor (22) are connected externally to the circuit (10) at a junction terminal (16) to provide a time delay following a transition of the status signal ($V_G$). The junction terminal of the resistor (20) and capacitor (22) is held at two transistor threshold voltages below the upper supply voltage (V+). At the time of transition of the status signal $V_G$ the junction terminal (16) is disconnected from a current path such that the terminal (16) is permitted to charge the capacitor (22) through the resistor (20). When the capacitor (22) has charged up to within one threshold voltage of the positive power terminal (V+) a transistor (48) is turned off thereby permitting the on-hook signal at line (50) to be driven negative thereby reliably indicating that the switch hook has been placed in the on-hook condition. The charging of the capacitor (22) serves as a time delay to eliminate faulty signal indications derived from noise and transients associated with the status signal ($V_G$).

10 Claims, 2 Drawing Figures

ON-HOOK/OFF-HOOK DETECTOR CIRCUIT

TECHNICAL FIELD

The present invention pertains to telephone communication circuits and more particularly to an integrated circuit for detecting on-hook and off-hook conditions.

BACKGROUND OF THE INVENTION

A variety of integrated circuits have been developed for use in applications associated with conventional telephone circuits. These integrated circuits must interface with existing telephone equipment and comply with telephone communication standards. The existing equipment and standards were not necessarily designed for use with integrated circuits and as such it is often difficult to directly implement a telephone function with an integrated circuit.

Integrated circuits offer the possibility of adding many new features to enhance the use of telephones. In many of these features it is required that the circuit be cognizant of the on-hook or off-hook condition of the telephone handset. Although a power terminal is present which makes a transition as the handset is moved on-hook and off-hook, this power signal is subject to intermittent operation and noise such that it cannot serve directly as a reliable indication of the on-hook or off-hook condition of the handset. Therefore, there exists a need for a circuit which can reliably determine the on-hook and off-hook condition of a telephone handset despite the presence of noise and the intermittent operation of telephone circuits.

SUMMARY OF THE INVENTION

In a selected embodiment of an on-hook/off-hook detector circuit in accordance with the present invention there is included a series combination of a resistor and capacitor connected together at a junction node between first and second power terminals. A current path is provided from the junction node to the second power terminal when a status signal is received at a first state. The junction node is clamped at a first preset voltage when the current path is provided to the second power terminal. The current path is opened when the status signal is received at a second state. When the current path is opened the capacitor is charged through the resistor to raise the voltage at the junction node to approach the voltage at the first power terminal. A transistor connected to the junction terminal changes state when the junction terminal reaches a second preset voltage to drive an output terminal from a first state to a second state. The state change at the output terminal occurs after a time delay from the state change of the status signal due to the charging time of the capacitor.

BRIEF DESCRIPTION OF THE DRAWINGS

For a more complete understanding of the present invention and the advantages thereof, reference is now made to the following description taken in conjunction with the accompanying drawings in which.

DETAILED DESCRIPTION OF THE INVENTION

Figure 1:
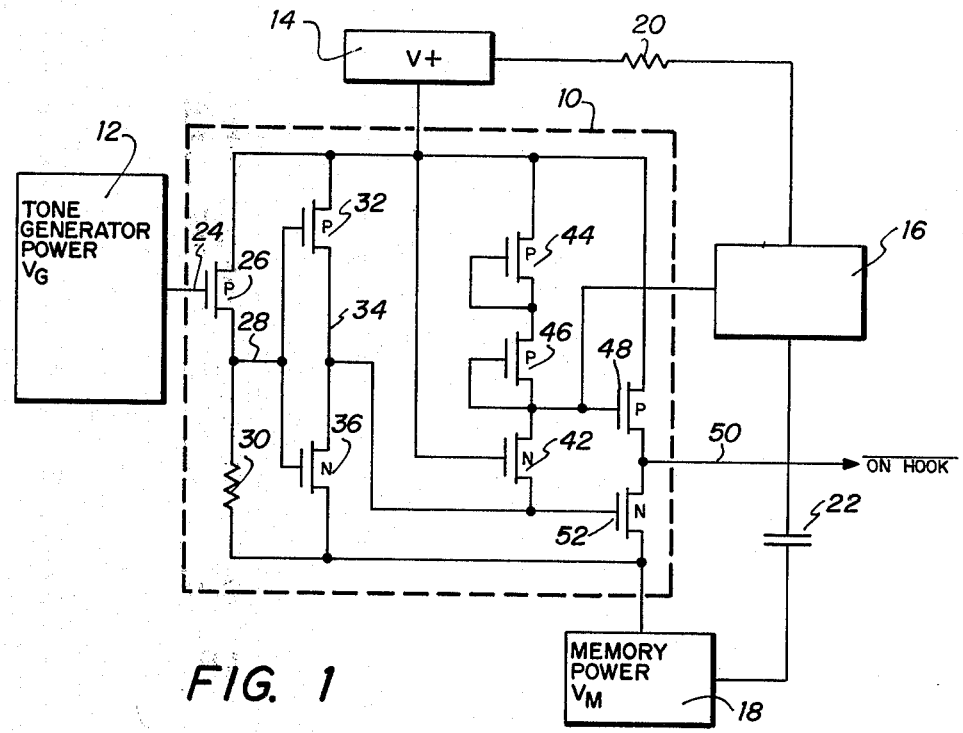
FIG. 1 is a schematic illustration of the on-hook/off-hook detector circuit of the present invention.
Figure 2:
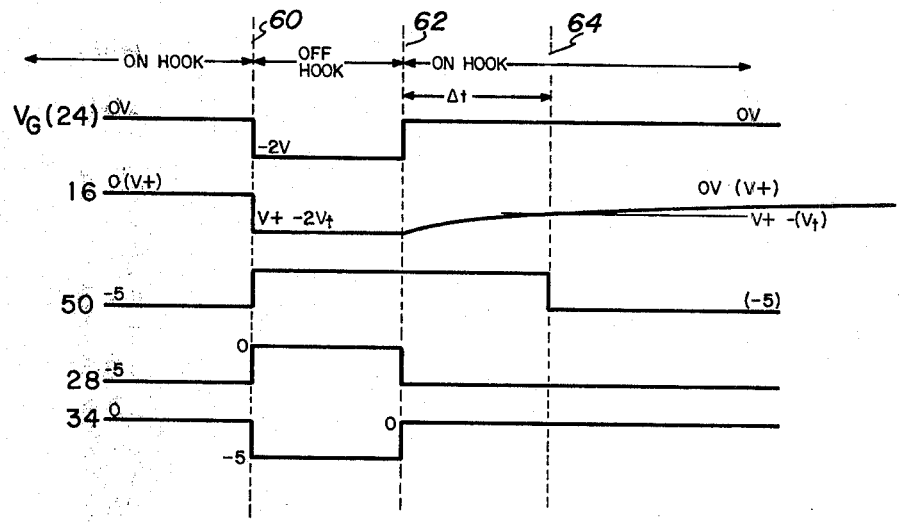
FIG. 2 is a illustration of waveforms which are present in the circuit illustrated in FIG. 1.

Referring to FIG. 1 a detector circuit 10 is included within the dotted lines and comprises an on-chip part of an overall integrated circuit. The integrated circuit has a plurality of external terminals for transmitting and receiving various signals. A number of these terminals are related to the operation of the detector circuit 10. A tone generator power terminal 12 receives a voltage which also powers a tone generator circuit $V_G$. (A tone generator circuit is not illustrated.) The signal $V_G$ is voltage divided down from a power voltage supplied from the central telephone office. The signal $V_G$ can serve as a status signal to indicate the position of a switch hook (not shown) for a telephone handset. When the switch hook is in the on-hook position the signal $V_G$ is at essentially 0 volts, but when the switch hook is in the off-hook position the signal $V_G$ is at approximately $-2$ volts and is utilized to power a tone generator circuit. The signal $V_G$ is illustrated in FIG. 2. Although it is shown as directly corresponding to switch hook position the signal $V_G$ in actual practice is subject to dropouts due to switching between central offices which causes a loss of the tone generator voltage for short periods of time when the switch hook is in the off-hook condition.

A power terminal 14 is supplied with a constant voltage $V+$ which in a preferred embodiment is at 0 volts.

An external terminal 16 is provided as a junction terminal for the connection of external components which are utilized with the operation of circuit 10.

A further external terminal 18 is connected to receive a memory power signal $V_M$. The $V_M$ signal is also derived from the telephone company supplied DC signal and in a preferred embodiment is $-5$ volts. Capacitors (not shown) are connected to terminal 18 to essentially eliminate dropouts and transients.

A resistor-capacitor circuit comprising resistor 20 and capacitor 22 is provided to time the operation of circuit 10. The resistor 20 and capacitor 22 are external to the integrated circuit which includes circuit 10. Resistor 20, which can have a typical impedance of 750 K ohms, is connected between terminals 14 and 16 and capacitor 22, which can typically have a one microfarad capacitance, is connected between terminals 16 and 18. Terminal 16 is at the junction of resistor 20 and capacitor 22. The RC time constant of components 20 and 22 is selected to provide the desired time delay for the operation of circuit 10.

The terminal 12 is connected through a line 24 to the gate terminal of a P-type transistor 26. The source terminal of transistor 26 is connected to the power terminal 14. The drain terminal of transistor 26 is connected to a node 28.

A bias resistor 30 is connected between node 28 and the terminal 18.

Node 28 is connected to the gate terminal of a P-type transistor 32 which has the source terminal connected to terminal 14 and the drain terminal connected to a node 34. The node 28 is also connected to the gate terminal of an N-type transistor 36 which has the drain terminal connected to node 34 and the source terminal connected to terminal 18. The combination of transistors 32 and 36 functions as an inverter with node 28 as the input terminal and node 34 as the output terminal. The combination of transistors 26, 32 and 36 and resistor 30 functions as a level shifter between the input on line 24 and the output on node 34. The signal waveforms on nodes 28 and 34 are illustrated in FIG. 2.

Node 34 is connected to the source terminal of an N-type transistor 42 which has the gate terminal connected to terminal 14 and the drain terminal connected to terminal 16.

A P-type transistor 44 has the source terminal connected to terminal 14 and the gate and drain terminals connected to the source terminal of another P-type transistor 46. The gate and drain terminals of transistor 46 are in turn connected to the drain terminal of transistor 42 and terminal 16.

A P-type transistor 48 has the source terminal connected to terminal 14, the gate terminal connected to terminal 16 and the drain terminal connected to a line 50 which transmits an on-hook signal. The signal on-hook, which is transmitted through line 50, is illustrated in FIG. 2.

The transistors 44, 46 and 48 are fabricated to have the same size such that they are matched and have essentially the same characteristics.

An N-type transistor 52 has the drain terminal connected to line 50, the gate terminal connected to node 34 and the source terminal connected to terminal 18.

Transistor 48 is fabricated to have a channel width to length ratio substantially greater than that of transistor 52. Transistor 48 therefore has a substantially lower on impedance than that of transistor 52.

The waveforms present at various terminals and nodes in the circuit shown in FIG. 1 are illustrated in FIG. 2. The state of the switch hook and the timing of the operation of circuit 10 are illustrated relative to vertical lines 60, 62 and 64 which define time sequential operation. The switch hook is in the on-hook condition to the left of line 60 and to the right of line 62. The switch hook is in the off-hook condition between lines 60 and 62. A time delay, $\Delta t$, between the positive transition of signal $V_G$ and the generation of the on-hook signal is the time between lines 62 and 64. The relative voltages for the signals illustrated in FIG. 2 represent a typical embodiment of the present invention although operating voltages can vary substantially from those shown without changing the basic operation of the circuit.

Operation of the detector circuit of the present invention is now described in reference to FIGS. 1 and 2. When the switch hook is in the on-hook condition, the signal $V_G$ is at the 0 volt level which serves to turn off transistor 26. Node 28 is pulled to the −5 volt level through resistor 30. Transistor 32 is turned on by the −5 volt bias on the gate terminal such that node 34 is pulled to the 0 volt level. The voltage at node 28 also serves to turn off transistor 36 thereby isolating node 34 from terminal 18. The voltage at node 34 logically corresponds to the voltage on line 24 but is offset depending upon the supply voltage to circuit 10.

When node 34 is at the 0 volt level, transistor 42 is turned off thereby isolating terminal 16 from terminal 18 through the current path comprising transistors 36 and 42. Since there is essentially no current flow through terminal 16, the plate of capacitor 22 at terminal 16 is charged to the voltage of terminal 14, which at 0 volts serves to turn off transistor 48.

Transistor 52 is turned on by the 0 volt level on node 34 thereby coupling line 50 to terminal 18 to pull line 50 to −5 volts.

When the switch hook goes to the off-hook condition as indicated at line 60 in FIG. 2, the signal $V_G$ goes to the −2 volt level to provide power to the tone generator circuit. The −2 volt level at the gate terminal of transistor 26 turns the transistor on thereby pulling node 28 up to the 0 volt level of terminal 14. This in turn serves to turn transistor 32 off and transistor 36 on to drive node 34 to a −5 volt level. When node 34 is driven to the −5 volt level transistor 42 is turned on thereby providing a current path from terminal 16 through transistors 42 and 36 to terminal 18. When transistor 42 is turned on, capacitor 22 is rapidly discharged due to the low on impedance of transistor 42. This serves to pull down the voltage at terminal 16. But, the transistors 44 and 46, which function essentially as diodes, clamp the voltage at terminal 16 to two voltage thresholds ($V_T$) below the voltage of terminal 14. This provides a two threshold bias across the gate and source terminals of transistor 48 thereby rendering transistor 48 conductive to pull line 50 to the 0 volt level of terminal 14.

Transistor 52 is turned off when node 34 is at the −5 volt level thereby isolating line 50 from terminal 18.

When the switch hook returns to the on-hook position as indicated by line 62 in FIG. 2, the signal $V_G$ returns to the 0 volt level. This causes transistor 26 to be turned off thereby pulling node 28 to the −5 volt level. This in turn causes transistor 32 to be turned on and transistor 36 to be turned off to force node 34 to the 0 volt level. When the voltage at node 34 is raised, transistor 42 is turned off thereby blocking the current path from terminal 16 to terminal 18. Transistor 52 is turned on but since transistor 48 is on and the on impedance of transistor 52 is substantially greater than that of transistor 48, line 50 remains at the 0 volt level.

Terminal 16 was left at the voltage of 2 $V_T$ below V+ (0 volts). When the current path from terminal 16 to terminal 18 through transistors 36 and 42 is opened the current through resistor 20 serves to charge capacitor 22. This is shown by the rising charge curve for terminal 16 in FIG. 2 starting at line 62. As long as the voltage between the gate and source terminals of transistor 48 is greater than one threshold, transistor 48 will remain turned on and line 50 will remain in the 0 volt state. But when terminal 16 charges to the point where the voltage thereon is less than one transistor threshold below the voltage at terminal 14, transistor 48 will be turned off and line 50 will be pulled to −5 volts by the connection through transistor 52 to terminal 18. The voltage transition on line 50 is indicated at vertical line 64 in FIG. 2. Thus, the voltage on line 50 drops suddenly when the voltage at terminal 16 is approximately 1 $V_T$ below the voltage at terminal 14. The charging of capacitor 22 thus provides a time delay $\Delta t$ as shown in FIG. 2. This time delay is conveniently selected by the values of components 20 and 22 which are external to the integrated circuit. It is typically set such that the time delay is in the range of 300 to 700 milliseconds. This serves to substantially eliminate voltage transients which occur for signal $V_G$ since such transients seldom exist for a sufficient time to cause the charging of capacitor 22 to a level to generate the on-hook signal.

The transition of the output signal at line 50 occurs at the 50% voltage level between the first voltage state (V+ + −2 $V_T$) at terminal 16 and the second voltage state ($V_T$) at terminal 16. Since the 50% charge time of the RC combination, elements 20 and 22, is independent of V+, the time delay of circuit 10 is thus independent of the supply voltage. For example, if the total voltage excursion at terminal 16 is 3 volts, the output signal transition at line 50 occurs when terminal 16 reaches 1.5 volts.

The on-hook signal at line 50 is utilized elsewhere in the integrated circuit to set up various functions in regard to the telephone circuit operations. In a redial circuit this signal serves to initiate the storage of the last number which was dialed such that at the next opportunity when the switch hook goes to the off-hook condition, the stored number can be entered into the telephone system without the need for the user to enter each of the digits.

Note in further reference to FIG. 2 that to the right of line 64 the voltage on terminal 16 charges up to its original state and that the voltages on all of the remaining nodes have returned to the original state such that the cycle previously described can be again executed.

The transition on the on-hook signal to indicate an on-hook condition occurs when the voltage at terminal 16 is at the midpoint between its two steady state voltages. Thus, the transition time is primarily dependent upon the component values for elements 20 and 22 and is relatively independent of the absolute threshold voltage for a given integrated circuit. Therefore, the operation of the circuit of the present invention is substantially independent of fabrication process variations.

In summary, the present invention provides a circuit for detecting on-hook and off-hook status for a telephone handset without the need for an additional hook switch through monitoring of a tone generator power signal. The circuit reliably indicates an on-hook condition despite transients which can occur in the power signal for the tone generator.

Although one embodiment of the invention has been illustrated in the accompanying drawings and described in the foregoing detailed description, it will be understood that the invention is not limited to the embodiments disclosed, but is capable of numerous rearrangements, modifications and substitutions without departing from the scope of the invention.

I claim:

1. An on-hook/off-hook detector circuit comprising:
a series combination of a resistor and a capacitor connected together at a junction node, the combination connected between first and second power terminals, and serving as a time delay;
means for providing a current path from said junction node to said second power terminal when a status signal is at a first state and for opening said current path when said status signal is at a second state wherein the voltage at said junction node approaches the voltage of said first power terminal as said capacitor is charged when said current path is open;
means for clamping said junction node at a first preset voltage when said current path is provided between said junction node and said second power terminal; and
means for driving an output terminal from a first state to a second state when the voltage at said junction node reaches a second preset voltage.

2. The circuit recited in claim 1 wherein said means for clamping comprises first and second transistors connected in series between said first power terminal and said junction node wherein each of said transistors provides a one threshold voltage drop to clamp said junction node at two transistor thresholds from the voltage at said first power terminal.

3. The circuit recited in claim 2 wherein said means for driving an output terminal includes a third transistor having the drain and source terminals thereof coupled between said first power terminal and said second power terminal and the gate terminal thereof connected to said junction node wherein said third transistor is rendered nonconductive when said junction node reaches approximately one transistor threshold voltage below the voltage at said first power terminal.

4. An on-hook/off-hook detector circuit, comprising:
first and second power terminals having respective first and second power states;
a resistor connected between said first power terminal and a junction terminal;
a capacitor connected between said junction terminal and said second power terminal;
means responsive to a status signal, which has first and second status states, for providing a current path from said junction terminal to said second power terminal when said status signal is at said first status state and for opening said current path when said status signal is at said second status state;
means for clamping said junction terminal at a preset voltage, which is between said first and second power states, when said current path is provided between said junction terminal and said second power terminal; and
means for driving an output terminal to a first output state when the voltage of said junction terminal is within a first half of the voltage range between said preset voltage and said first power state and for driving said output terminal to a second output state when the voltage at said junction terminal is within the other half of said voltage range.

5. The circuit recited in claim 4 wherein said means for providing a current path comprises:
a first P-type transistor having the source terminal thereof connected to said first power terminal, the drain terminal thereof connected to a first node and the gate terminal thereof connected to receive said status signal;
a first resistor connected between said first node and said second power terminal;
a second P-type transistor having the source terminal thereof connected to said first power terminal, the drain terminal thereof connected to a second node and the gate terminal thereof connected to said first node;
a first N-type transistor having the drain terminal thereof connected to said second node, the source terminal thereof connected to said second power terminal and the gate terminal thereof connected to said first node; and
a second N-type transistor having the drain terminal thereof connected to said junction terminal, the source terminal thereof connected to said second node and the gate terminal thereof connected to said first power terminal wherein said first and second N-type transistor are rendered conductive when said status signal is at said first status state and said first and second N-type transistor are rendered nonconductive when said status signal is at said second status state.

6. The circuit recited in claim 5 wherein said means for driving an output terminal comprises:
a fifth P-type transistor having the source terminal thereof connected to said first power terminal, the drain terminal thereof connected to said output terminal and the gate terminal thereof connected to the drain terminal of said second N-type transistor; and a third N-type transistor having the drain terminal thereof connected to said output terminal, the source terminal thereof connected to said second power terminal and the gate terminal thereof connected to said second node, said third N-type transistor having a lower width to length channel ratio than said fifth P-type transistor.

7. The circuit recited in claim 4 wherein said means for clamping said junction terminal comprises:
a third P-type transistor having the source terminal thereof connected to said first power terminal and the gate and drain terminals thereof connected to a third node; and
a fourth P-type transistor having the source terminal thereof connected to said third node and the gate and drain terminals thereof connected to said junction terminal.

8. An on-hook/off-hook detector circuit, comprising:
first and second power terminals having respective first and second power states;
a first resistor connected between said first power terminal and a junction terminal;
a capacitor connected between said junction terminal and said second power terminal;
a first P-type transistor having the source terminal thereof connected to said first power terminal, the drain terminal thereof connected to a first node and the gate terminal thereof connected to receive a status signal which has first and second status states;
a second resistor connected between said first node and said second power terminal;
a second P-type transistor having the source terminal thereof connected to said first power terminal, the drain terminal thereof connected to a second node and the gate terminal thereof connected to said first node;
a first N-type transistor having the drain terminal thereof connected to said second node, the source terminal thereof connected to said second power terminal and the gate terminal thereof connected to said first node;
a second N-type transistor having the drain terminal thereof connected to said junction terminal, the source terminal thereof connected to said second node and the gate terminal thereof connected to said first power terminal wherein said first and second N-type transistors are rendered conductive when said status signal is at said first status state and said first and second N-type transistor are rendered nonconductive when said status signal is at said second status state;
a third P-type transistor having the source terminal thereof connected to said first power terminal and the gate and drain terminals thereof connected to a third node;
a fourth P-type transistor having the source terminal thereof connected to said third node and the gate and drain terminals thereof connected to said junction terminal;
a fifth P-type transistor having the source terminal thereof connected to said first power terminal, the drain terminal thereof connected to an output terminal and the gate terminal thereof connected to the drain terminal of said second N-type transistor; and
a third N-type transistor having the drain terminal thereof connected to said output terminal, the source terminal thereof connected to said second power terminal and the gate terminal thereof connected to said second node, said third N-type transistor having a lower width to length channel ratio than said fifth P-type transistor.

9. A method for detecting on-hook and off-hook status, comprising the steps of:
clamping a junction terminal to a first preset voltage when a status signal is at a first status state wherein said junction terminal is connected to a capacitor;
charging said capacitor over a time period to change the voltage at said junction terminal from said first preset voltage to a second preset voltage, said charging starting when said status signal transitions from a first status state to a second status state; and
driving an output terminal from a first output state to a second output state when the voltage at said junction terminal reaches said second preset voltage.

10. The method recited in claim 9 wherein said first and second preset voltages differ in amplitude by one transistor threshold.

* * * * *